May 19, 1953 E. H. WOODHULL 2,638,920
PNEUMATICALLY OPERATED CONTROL SYSTEM
Filed Jan. 13, 1951 2 Sheets-Sheet 1

INVENTORS
ELLIOT H. WOODHULL
BY D. Clyde Jones
ATTORNEY

May 19, 1953 E. H. WOODHULL 2,638,920
PNEUMATICALLY OPERATED CONTROL SYSTEM
Filed Jan. 13, 1951 2 Sheets-Sheet 2

INVENTORS
*ELLIOT H. WOODHULL*
BY
*D. Clyde Jones*
ATTORNEY

Patented May 19, 1953

2,638,920

UNITED STATES PATENT OFFICE 2,638,920

PNEUMATICALLY OPERATED CONTROL SYSTEM

Elliot H. Woodhull, Rochester, N. Y., assignor to Taylor Instrument Companies, Rochester, N. Y., a corporation of New York Application January 13, 1951, Serial No. 205,905

10 Claims. (Cl. 137—492)

This invention relates to a pneumatically operated control system for maintaining a process variable such as temperature, pressure, rate of flow, liquid level and the like, at a predetermined value.

The present invention has for one of its purposes, the production of a control system which will maintain highly accurate control of a process variable under extremely adverse conditions, which is simple to adjust, and which is relatively inexpensive to manufacture.

Another purpose of the invention is the production of a variable gain stage of the pneumatic type in which the output pressure thereof is amplified or attenuated at will with respect to the input pressure to said stage.

Figure 1:
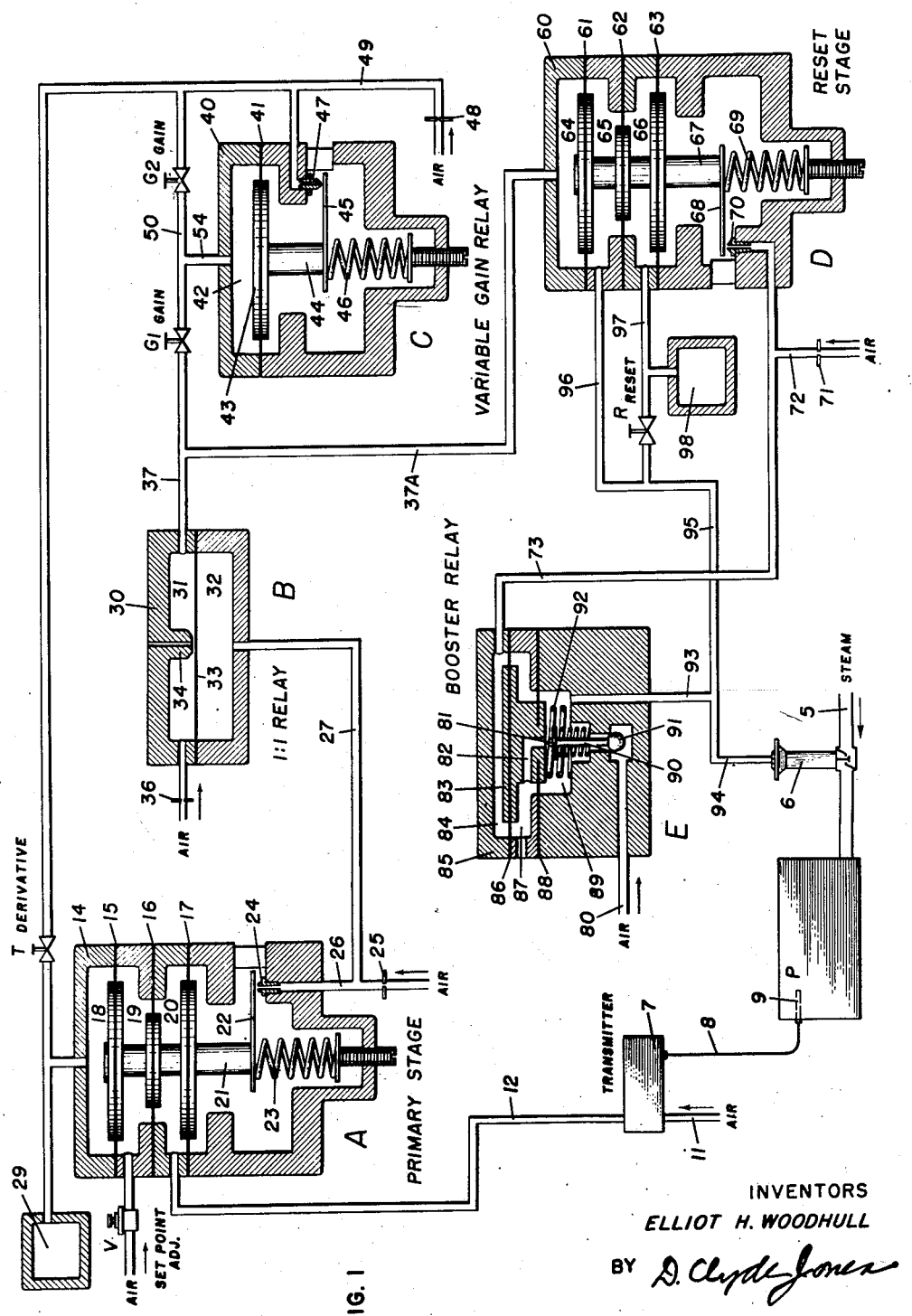
Figure 2:
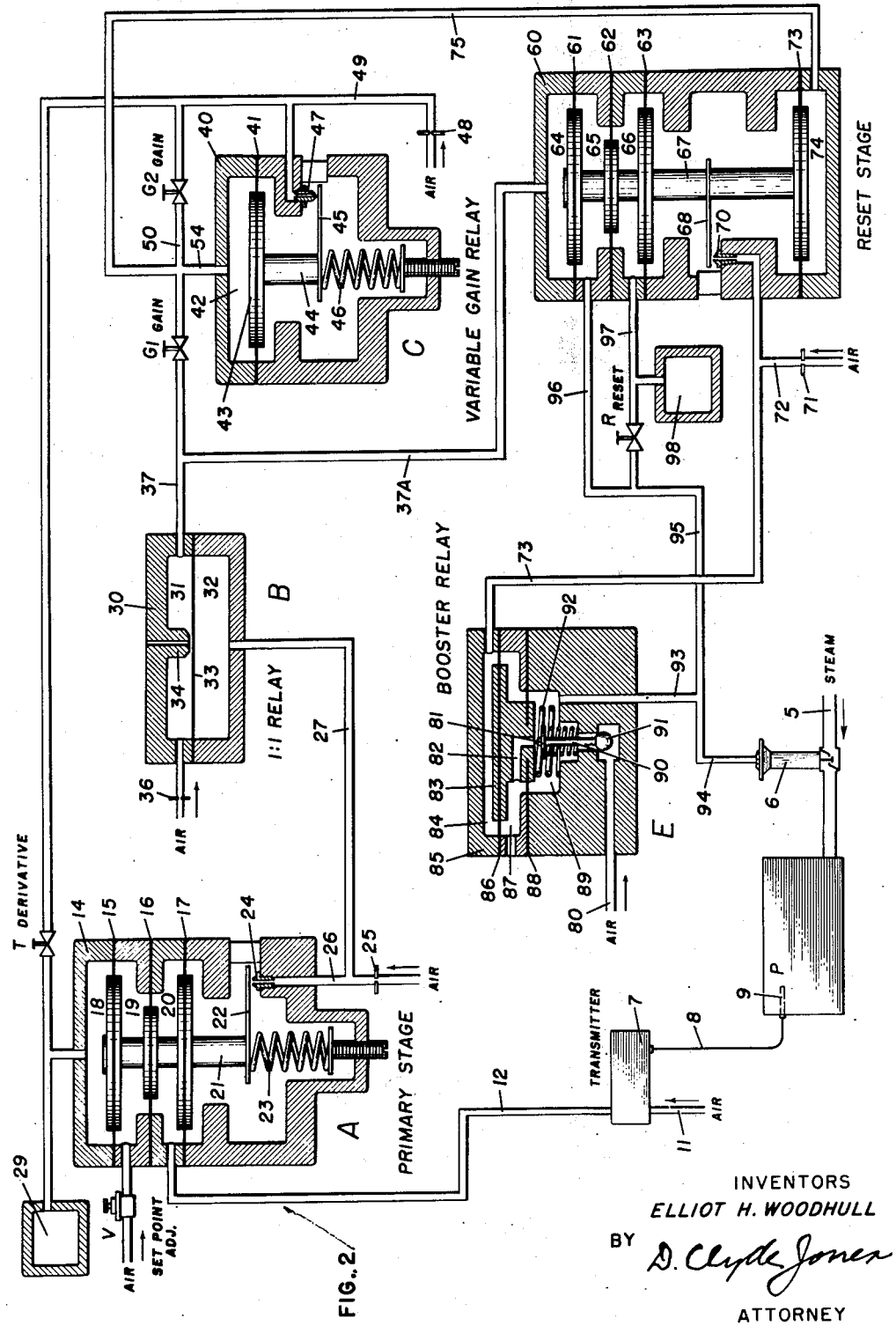

The various features and advantages of the invention will appear from the detailed description and claims when taken with the drawings in which Fig. 1 is a diagrammatic showing of the control system of the present invention; and Fig. 2 is a diagrammatic illustration of a modified form of the invention.

Referring to Fig. 1 of the drawings, there is illustrated, by way of example, a system for the control of temperature of a given process P to which steam is supplied through the pipe 5 under the control of a diaphragm motor valve 6, the valve 6 being controlled by the system to admit the proper amount of steam into the process to maintain it at the desired temperature. The system includes a primary stage or unit A, a one-to-one isolating relay B, a variable gain relay stage C, a reset stage D, and a booster relay E.

The temperature of the process is sensed by a temperature transmitter 7 including a capillary tube 8 of a tube system which terminates in a bulb 9 exposed to the process medium. This transmitter may be similar in construction to that disclosed in the patent of Matner et al. 2,536,198 granted January 2, 1951. The temperature transmitter 7 transmits air under pressure from the source 11, at a signal pressure inversely proportional to the temperature value sensed at the bulb 9. This proportional pressure is communicated through the pipe 12 to the primary unit A herein referred to as the primary stage.

The primary stage comprises a casing 14 with parallel diaphragms 15, 16 and 17 sealed at their margins by being clamped in the sidewall of the casing to define the chambers 18, 19 and 20. The centers of the diaphragms are secured in sealed relation to a pillar 21. The pillar 21 carries the left end of baffle 22 which pillar is biased upward by compression spring 23. The forces on the several diaphragms, caused by the pressures in the chambers 18, 19 and 20 produce a resultant force which tends to move pillar 21 up or down thereby moving baffle 22 with respect to nozzle 24.

The signal pressure in the pipe 12 is applied to the chamber 20 of unit A while a selected control pressure, which determines the set point or desired control temperature of the system, is applied to the chamber 19. The selected control pressure is preferably adjusted by a manually operated pressure reducing valve V.

A feedback pressure governed by the variable gain relay stage C as will be described, is applied to the chamber 18, the variable gain relay stage being controlled by the output pressure of the one-to-one isolating relay B which is governed by the output pressure in pipe 27 of the primary stage.

Fluid under pressure, such as compressed air under uniform pressure is supplied through restriction 25 and pipe 26, to a nozzle 24 where it bleeds to the atmosphere depending on the spacing between the baffle 22 and the nozzle 24. This action controls the output pressure in pipe 26 which communicates through branch pipe 27 and the one-to-one isolating relay B with a pressure dividing network forming a part of the variable gain relay stage C, for a purpose to be described. It will be noted that this variable gain relay is effectively connected in a feed-back circuit from the output pipe 27 of the primary stage A to the chamber 18 of this stage, thereby providing a sensitivity control for the system whereby the amount of movement of valve 6 for any given temperature change can be effected at will.

As is well known in the art, the use of restriction T in the feedback pressure line to chamber 18 results in derivative response in addition to the proportional response just described. The time constant of the derivative response may be adjusted by adjusting the resistance of restriction T, which restriction is preferably a needle valve. The derivative time constant also depends upon the capacity associated with chamber 18. A capacity tank such as 29 may be used to increase the derivative time constants obtainable.

It should be noted that when the set point pressure in chamber 19 and the transmitted signal pressure in chamber 20 are constant and equal, the equilibrium pressure in chamber 18 can be set at a chosen intermediate value in the range between zero pressure and the pressure of the source, which may be twenty pounds per square inch, by adjustment of the compression of spring 23.

The isolating one-to-one relay B comprises a casing 30 which is divided into an upper chamber 31 and a lower chamber 32 by a diaphragm 33 which has its margin sealed in the walls of the casing to prevent fluid from passing from one of these chambers to the other. A source of compressed air at uniform pressure is supplied through restriction 36 to the chamber 31 while the controlled pressure in branch pipe 27 is applied to chamber 32. The top of the casing is provided with an inwardly directed nozzle 34 exhausting the chamber 31 to the atmosphere, under the control of the diaphragm 33 which cooperates with the nozzle to vary the escape of fluid therethrough. The operation of the isolating relay B is such that the output pressure in pipe 37 is equal to the input pressure in pipe 27 but this output pressure cannot react back on the input pressure in pipe 27.

The pipe 37 communicates with the relay of stage C which comprises a casing 40 provided with a flexible diaphragm 41 sealed thereto, to define a chamber 42. A disc 43 mounted on this diaphragm has a downwardly projecting lug 44 which carries the left end of baffle 45, the lug being biased upward by a spring 46. The right end of the baffle 45 cooperates with a nozzle 47 to constitute a control couple. A source of compressed air at a uniform pressure is supplied through restriction 48 and the pipe 49, to the nozzle 47 where it escapes to the atmosphere under the control of the baffle 45 thereby varying the back pressure in pipe 49. An increase in pressure in chamber 42 results in a decrease in pressure in pipe 49. Pipe 49 communicates this varying back pressure to the chamber 18 of the primary stage A.

A pressure divider supplies fluid under controlled pressure to the chamber 42 of the variable gain relay stage. This pressure divider comprises a pipe 50 having restrictions or adjustable needle valves G1 and G2 connected in series therein. One end of pipe 50 communicates with the output pipe 37 of the isolating relay while the other end of pipe 50 communicates with the output pipe 49 of the relay C. A pipe 54 communicating with pipe 50 at a point between the restrictions G1 and G2 leads to chamber 42 to supply pressure thereto for operating the relay C. This pressure divider provides means for adjusting the sensitivity of the system, that is, the amount that motor valve 6 opens or closes for a given change in temperature.

The ratio of the pressure change in pipe 49, to the pressure change in pipe 37, is the gain of the relay. It should be pointed out that the effective area of the diaphragm 41 of chamber 42 and the spring rate of spring 46 are so chosen that the gain of the relay C with restriction G2 closed, is relatively large, for example, 100 times. Therefore, to move baffle 45 from a capped position to a fully uncovered position requires a relatively small change in the pressure in the chamber 42, for example 0.2 of a pound per square inch. Consequently, in normal operation, the pressure in chamber 42 is nearly constant.

By suitable selection of the circuit constants, the operation of the parts of the circuit so far described will not be changed by connecting pipe 27 directly to pipe 37 and removing relay B. It is also obvious that in practice only one of the restrictions G1 and G2 needs to be adjustable.

When the pressure in pipe 37 is at the chosen intermediate value, as described above, it is desirable to have the pressure in pipe 49 at this same value so that either restriction G1 and G2 or both may be adjusted to change the gain of the relay stage C without causing any change in pressure in pipe 49. This is accomplished by adjusting the compression in spring 46 until with this predetermined pressure in chamber 42, this same pressure is present in pipe 49.

The reset stage D comprises a casing 60 which with the parallel diaphragms 61, 62 and 63 sealed thereto, provides a primary chamber 64, a secondary chamber 65 and a tertiary chamber 66. Pressure in the output pipe 37 of the isolating relay B is communicated through branch pipe 37A to the primary chamber 64. A pillar 67 connected to the centers of these diaphragms, partakes of the resultant movement thereof to move in a vertical direction in response to changes in the pressures in the chambers of the reset stage. The lower end of the pillar 67 carries the right end of a baffle 68, the pillar being biased upward by a spring 69. The left end of the baffle cooperates with the nozzle 70 to constitute a control couple. A source of compressed air under uniform pressure is supplied through restriction 71 and pipe 72 to the output pipe 73 from which it bleeds to the atmosphere through nozzle 70 under the control of the baffle 68. The action of the baffle throttles the pressure in the output pipe 73, communicating with the chamber 84 of the booster relay E to which air under uniform pressure is supplied through pipe 80.

The booster relay comprises a casing 85 including a top cap, an intermediate ring and a bottom portion separated by diaphragms 86 and 88 to define the chambers 84, 87 and 89. The diaphragms are connected at their centers to a pillar 83 so that they operate as a unit against the biasing action of spring 92, in response to the difference in pressures applied to their respective surfaces. The pillar 83 has a passage 82 therein leading to chamber 87 which communicates with the atmosphere through an opening in the intermediate ring. Pillar 83 has a valve seat at the entrance to the passage 82, controlled by a ball valve 81 provided at the upper end of an upwardly spring-biased valve stem 90 and governing the flow of air through the passage. Compressed air is supplied through the pipe 80 into chamber 89 under the control of a ball valve 91 carried on the lower end of the valve stem 90, and cooperating with a seat formed in the casing at the entrance to chamber 89. The pressure in the chamber 89 is applied to the diaphragm 88 tending to oppose the action of the pressure applied to diaphragm 86 comprising a part of the chamber 84. Throttled compressed air is supplied from the chamber 89 through the pipes 93 and 94 which communicate with the diaphragm motor of valve 6. This tends to position valve 6 so that the proper amount of steam is supplied through the pipe 5, to correct any deviation from the desired value of the process. The pipe 93 also communicates through the branch pipe 95 and 96 with the chamber 65 in the reset unit D to effect a balance with the incoming pressure which is supplied to the chamber 64, and through pipe 95, restriction R and pipe 97 with chamber 66 of the reset unit D.

Spring 69 of the reset stage D and 92 of the booster relay E are preferably adjusted so that when the pressure in chamber 64 of the reset stage is constant and at the chosen intermediate pressure of the primary stage A, the pressures in pipe 95 and in the chambers 65 and 66 are all at the same pressure. With this initial condition an increase in pressure in chamber 64 will result in a proportional increase in pressure in pipe 95 and chamber 65. This increase in pressure in line 95 will also be transmitted with a time lag through restriction R and pipe 97 to chamber 66 and capacity tank 98. As the pressure in chamber 66 increases, a further increase in pressure in pipe 95 and chamber 65 will result. As is well known in the art, the use of restriction R, associated capacity and chamber 66 results in the output of stage D and its booster relay being proportional to input of chamber 64 and proportional to the time integral of the input to chamber 64. This response is commonly known as proportional plus reset response. The reset response rate may be adjusted by adjusting the resistance of restriction R which restriction is preferably a needle valve.

It has been indicated that the output primary stage A gives derivative response and proportional response. These responses are exhibited in the input pressure to chamber 64 of the reset relay with consequent output pressure to the diaphragm motor valve 6 which has reset, proportional and derivative responses.

Fig. 2 shows a modified form of the control system shown in Fig. 1. As has been noted the gain of the relay in the variable gain stage is preferably high. When the gain is high the operation of the variable gain stage is such that the pressure in chamber 42 is sufficiently constant to be applied through pipe 75 and used in conjunction with diaphragm 73 of chamber 74 for biasing the reset stage, thereby eliminating the need for a biasing spring such as 69 shown in Figure 1. Replacing this biasing spring by a pressure bias changes none of the essential characteristics of the system.

It should be pointed out that the present invention provides automatic start-up of a process without "overshooting" of the control or set point and provides automatic compensation for load changes in the process.

While two embodiments of the invention have been disclosed, it will be understood that there can be other embodiments and modifications thereof within the scope of the appended claims, without departing from the spirit of the present invention.

What I claim is:

1. A fluid operated selectively adjustable gain relay stage, a primary source of fluid under modulated pressure, a secondary source of fluid under a predetermined reference pressure, said relay stage having an output pipe, said relay stage having a pressure responsive chamber and a valve operated by said chamber to vary the pressure of the fluid supplied to said output pipe from said secondary source, said relay stage also having means including an adjustable pressure proportioning network including adjustable resistances for applying operating fluid under pressure to said chamber, the pressure change of said operating fluid pressure being proportional to the pressure change from said primary source and to the pressure change from said valve, the constants of proportionality being determined by the adjustment of the resistances in the pressure proportioning network.

2. A fluid operated selectively adjustable gain relay stage, a primary source of fluid under modulated pressure, a secondary source of fluid under a predetermined reference pressure, said relay stage having an output pipe, said relay stage having a pressure responsive chamber and a valve operated by said chamber to vary the pressure of the fluid supplied to said output pipe from said secondary source, said relay stage also having means including an adjustable pressure proportioning network including resistances at least one of which is adjustable for applying operating fluid under pressure to said chamber, the pressure change of said operating fluid pressure being proportional to the pressure change from said primary source and to the pressure change from said valve, the constant of proportionality being determined by the adjustment of resistances in the pressure modifying network, said relay stage having means whereby the value of pressure at which the pressure from said valve is equal to the pressure from said primary source, can be adjusted to any value within the operating ranges of the pressure from said primary source and the pressure from said valve.

3. A fluid operated selectively adjustable gain relay stage, a source of signal fluid under modulated pressure, a secondary source of fluid under uniform pressure, said relay stage having a signal pipe to which the signal fluid is supplied and an output pipe, said relay stage comprising a valve to vary the pressure of the fluid supplied to said output pipe from said secondary source and a member responsive to fluid under pressure for actuating said valve, said relay stage also comprising a pressure modifying network adjustably coupling said signal pipe and said output pipe for supplying operating fluid under pressure to said member jointly from said signal pipe and from said output pipe whereby the change of pressure of the fluid in said output pipe can be amplified or attenuated at will with respect to the change of pressure of the signal fluid.

4. A fluid operated selectively adjustable gain relay stage, a source of signal fluid under modulated pressure, a secondary source of fluid under a selectively adjustable pressure, said relay stage having a signal pipe and an output pipe and comprising a pressure responsive member and a valve operated by said member to vary the pressure of the fluid supplied to said output pipe from said secondary source, means including a selectively adjustable pressure modifying network variably coupling said output pipe to said signal pipe for supplying operating fluid under pressure to said member jointly from said signal source and from said fluid under pressure in said output pipe whereby the change of pressure of the fluid in said output pipe can be amplified or attenuated at will with respect to the change of pressure of the signal fluid.

5. A fluid operated selectively adjustable gain relay stage for use in a system for controlling the value of a variable, a source of signal fluid under modulated pressure, a secondary source of fluid under a given pressure, said relay stage having an input pipe and an output pipe and comprising a member responsive to fluid under pressure supplied through said input pipe and a valve operated by said member to vary the pressure of the fluid supplied to said output pipe from said secondary source, a connecting pipe communicating with the source of signal fluid and with said output pipe, two restrictions connected in series in said connecting pipe at least one of said restrictions being selectively adjustable, said input pipe communicating with said connecting pipe at a point between said restrictions whereby the pressure change of the fluid in said output pipe can be amplified or attenuated at will with respect to the pressure change of the signal fluid.

6. A fluid operated selectively adjustable gain relay stage, a source of signal fluid under modulated pressure, a secondary source of fluid under uniform pressure, said relay stage having an input pipe and an output pipe and comprising a pressure responsive member and a valve operated by said member to vary the pressure of the fluid supplied to said output pipe from said secondary source, means including a selectively adjustable pressure dividing network for supplying operating fluid under pressure to said member jointly from said signal source and from said fluid under varied pressure in said output pipe whereby the change of pressure of the fluid in said output pipe can be amplified or attenuated at will with respect to the change of pressure of the signal fluid, said network including a fluid conduit having two restrictions at least one of which is adjustable, connected in series therein for coupling said modulated signal source with said output pipe and a fluid connection to said input pipe from a point in said conduit between said restrictions.

7. In a system for maintaining a variable condition at a predetermined value, means for sensing the values of the variable condition and for transmitting a fluid under pressure corresponding to the sensed value, a primary unit operated in response to the transmitted pressure for delivering fluid under controlled pressure, a source of fluid under a selectively adjustable predetermined pressure, means including a pipe communicating with the primary unit and a variable gain relay stage including a relay for controlling the pressure of fluid applied from said source through said pipe to the primary unit for modifying the action thereof, said relay stage including an adjustable pressure modifying network for supplying operating fluid under pressure to said relay jointly from said applied fluid and said relay jointly from said applied fluid and from said delivered fluid whereby the change of pressure of said applied fluid from the relay stage can be amplified or attenuated at will with respect to the delivered fluid under pressure, and mechanism responsive to the delivered fluid for restoring said condition to substantially said predetermined value.

8. In a system for maintaining a variable condition at a predetermined value, means for sensing the values of the variable condition and for transmitting a fluid under pressure corresponding to the sensed value, a primary unit operated in response to the transmitted pressure for delivering fluid under pressure proportional to the transmitted pressure, a source of fluid under a selectively adjustable predetermined pressure, means including a connection communicating with the primary unit and a variable gain relay stage comprising a relay controlling the pressure of the fluid applied through said connection from said source to the primary unit for modifying the action thereof, said relay stage including an adjustable pressure modifying network for supplying operating fluid under pressure to said relay jointly from said applied fluid and from said delivered fluid whereby the change of pressure of said applied fluid from the relay stage can be amplified or attenuated at will with respect to the delivered fluid pressure, an additional source of fluid under pressure, a reset unit responsive to said delivered fluid for controlling operating fluid from said additional source at a pressure proportional to the sensed change and proportional to the integral of the sensed change with respect to time, and mechanism responsive to the operating fluid for restoring said condition to substantially said predetermined value.

9. In a system for maintaining a variable condition at a predetermined value, means for sensing changes in the value of the variable condition and for transmitting a fluid under pressure corresponding to the sensed change, a primary unit operated in response to the transmitted pressure for delivering fluid under pressure portional to the transmitted pressure, and proportional to the rate of change in the transmitted pressure, a source of fluid under a selectively adjustable predetermined pressure, means including a pipe communicating with said primary unit and a variable gain relay stage comprising a relay controlling the pressure of the fluid applied from said source through said pipe to the primary unit for modifying the action thereof, said relay stage including an adjustable pressure modifying network for supplying operating fluid under pressure to said relay jointly from said applied fluid and from said delivered fluid whereby the change of pressure of said applied fluid from the relay stage can be amplified or attenuated at will with respect to the delivered fluid pressure, an additional source of fluid under pressure, a reset unit responsive to said delivered fluid for controlling operating fluid from said additional source at a pressure proportional to the sensed change and proportional to the integral of the sensed change with respect to time, and mechanism responsive to the operating fluid for restoring said condition to substantially said predetermined value.

10. In a fluid actuated system, a selectively adjustable gain relay having an input pipe to which a fluid under modulated pressure is supplied, and an output pipe, an auxiliary source of fluid under selectively adjustable predetermined pressure, said relay comprising a member responsive to fluid under pressure supplied through an input conduit, a valve operated by said member to vary the pressure of the fluid supplied to said output pipe from said auxiliary source, a connecting conduit communicating with said input pipe and with said output pipe, and two restrictions connected in series in said connecting conduit, at least one of said restrictions being selectively adjustable, said input conduit communicating with said connection conduit at a point between said restrictions whereby the pressure differential between the pressures in the input pipe and in the output pipe can be amplified or attenuated at will with respect to the change in pressure in the input pipe.

ELLIOT H. WOODHULL.

References Cited in the file of this patent

UNITED STATES PATENTS

| Number | Name | Date |
|---|---|---|
| 2,441,405 | Fitch | May 11, 1948 |
| 2,517,051 | Swenson | Aug. 1, 1950 |